United States Patent
Aoki et al.

(10) Patent No.: US 7,877,775 B2
(45) Date of Patent: Jan. 25, 2011

(54) COORDINATION METHOD AND MOBILE TERMINAL

(75) Inventors: Takashi Aoki, Tokyo (JP); Yusuke Murai, Tokyo (JP); Satoru Yokota, Tokyo (JP); Takeo Matsuba, Tokyo (JP)

(73) Assignee: Vodafone K.K., Tokyo (JP)

( * ) Notice: Subject to any disclaimer, the term of this patent is extended or adjusted under 35 U.S.C. 154(b) by 921 days.

(21) Appl. No.: 11/797,141

(22) Filed: May 1, 2007

(65) Prior Publication Data

US 2007/0213844 A1  Sep. 13, 2007

Related U.S. Application Data

(63) Continuation of application No. PCT/JP2005/022003, filed on Nov. 30, 2005.

(30) Foreign Application Priority Data

Dec. 1, 2004  (JP)  .............................. 2004-348777

(51) Int. Cl.
  *H04N 7/16*  (2006.01)
  *G06F 9/46*  (2006.01)
  *H04M 1/00*  (2006.01)
(52) U.S. Cl. .......................... 725/62; 718/108; 455/566
(58) Field of Classification Search .................... 725/62
  See application file for complete search history.

(56) References Cited

U.S. PATENT DOCUMENTS

| 6,874,145 | B1 * | 3/2005 | Ye et al. ...................... 718/108 |
| 7,016,706 | B2 * | 3/2006 | Kurokawa et al. .......... 455/566 |
| 7,600,045 | B2 * | 10/2009 | Horii et al. ................... 709/246 |
| 7,647,075 | B2 * | 1/2010 | Tsuda et al. ................. 455/566 |
| 2004/0077386 | A1 * | 4/2004 | Nagasawa ................ 455/575.1 |
| 2005/0071868 | A1 * | 3/2005 | Yoshida ........................ 725/39 |

FOREIGN PATENT DOCUMENTS

| CN | 1289088 A | 3/2001 |
| CN | 1360695 A | 7/2002 |
| EP | 1 085 757 A2 | 3/2001 |
| EP | 1 194 840 | 4/2002 |
| JP | 2001-154858 | 6/2001 |
| JP | 2003-504753 | 2/2003 |
| JP | 2003-67200 | 3/2003 |
| KR | 2002-0022085 | 3/2002 |
| WO | WO 01/04743 A2 | 1/2001 |

* cited by examiner

*Primary Examiner*—John W Miller
*Assistant Examiner*—Chris Parry
(74) *Attorney, Agent, or Firm*—Kratz, Quintos & Hanson, LLP

(57) ABSTRACT

When a command for starting up a specific versatile application of a versatile application section is made during an execution of a native application included in a basic processing section, a judgment of the following condition for combining is satisfied: whether or not the specific versatile application is in a paused state, and the specific versatile application has made a request for starting up the native application, is made (step S51). When a judgment that the condition for combining is satisfied is made, an execution of the specific versatile application is restarted (step S56). As a result, it is possible to have a prompt coordination between the basic processing section and the versatile application, while respecting a feeling of presence which is established in the mind of a user.

9 Claims, 12 Drawing Sheets

COORDINATION METHOD AND MOBILE TERMINAL

RELATED APPLICATION

This is a continuation application of the international patent application No. PCT/JP2005/022003 filed with Application date Nov. 30, 2005.

BACKGROUND OF THE INVENTION

The present invention relates to a coordination method and a mobile terminal, and more particularly to a coordination method for operating in coordination of a basic processing section which performs a control and a processing of an internal resource, and a versatile application section which includes at least one versatile application which uses a function of the basic processing section, and a mobile terminal which uses the coordination method.

BACKGROUND ART

Mobile communication terminals such as a cellular phone have been hitherto used widely. There has been a remarkable development in functions and performance of the mobile communication terminals. It has been possible to watch television (hereinafter, "TV") broadcasting and enjoy games by executing various applications, in addition to a communication function, and a mail sending and receiving function which are essential functions as the mobile communication terminal.

A native application which is included in a basic processing section which performs a task management and a management of hardware resources, as well as provides basic functions including the essential function, and a versatile application which does not depend on a model of the mobile terminal are examples of such applications. Out of these two types of applications, the versatile application is normally operated by using a resource which can be managed by its own. However, some times there occurs to be a need for requesting a process which can be performed only by the basic processing section. In such a case, a coordination operation in which the versatile application makes a request for the process to the basic processing section, and the basic processing section performs the process, is performed. This coordination operation includes a coordination operation of making a request for a start-up of the native application by the versatile application to the basic processing section, and performing a process by the native application according to the request.

In a coordination operation in which such a versatile application becomes a trigger, the basic processing section which has received the request for executing the process from the versatile application executes the process for which the request is made, but prior to executing the process, the basic processing section pauses the versatile application. After pausing the versatile application, the basic processing section executes a process for which the request is made.

Moreover, for corresponding with a command of a user, when a start-up of the versatile application is necessary during an operation of the native application, in the basic processing section, a coordination operation of stopping the operation of the native application, and starting up the versatile application, is performed. In such a coordinated operation in which the native application is let to be a trigger, when there does not exist a versatile application which is in a paused state, the basic processing section, starts up the versatile application immediately after stopping the operation of the native application.

On the other hand, when there exists a versatile application which is in the paused state, the basic processing section, after stopping the operation of the native application upon receiving user's approval, stops the versatile application which is in the paused state. After stopping the versatile application, the versatile application which has been specified by user's command, used to be started up.

SUMMARY OF THE INVENTION

Problems to be Solved by the Invention

The conventional technology, from a point of view of realizing assuredly and uniformly a coordination of a basic processing section and a versatile application, is an excellent technology. However, when an attention is focused on the coordination operation in which the native application is let to be a trigger, when there exists an application which is in a paused state, the process has to pass through two stages of stopping completely the versatile application which is paused upon receiving user's approval, and starting up a versatile application according to user's command. Therefore, in the coordination operation in which the native application is let to be the trigger, even when the versatile application which is in the paused state coincides with a versatile application which is about to be started up from that time, a processing time for stopping completely the application which is paused upon receiving the user's approval, and a processing time of starting up the versatile application according to the user's command were required necessarily.

Therefore, from a view point of speeding up, when the versatile application which is in the paused state coincides with the versatile application which is about to be started up from that time, adopting a method of letting to restart automatically the versatile application which is in the paused state can be taken into consideration. However, according to findings achieved as a result of research and development by inventors of the present invention, it was revealed that even when the versatile application which is in the paused state coincides with the versatile application which is about to be started up from that time, according to a cause of the pause, some times it is appropriate to start up newly, after stopping completely once the versatile application which is in the paused state. For example, when the cause of the pause has no relationship whatsoever with the execution of the native application, it is appropriate to rather execute the versatile application from the beginning, for the user who has made the command for starting up of the versatile application during the execution of the native application.

The present invention is made in view of the abovementioned circumstances, and it is an object of the present invention to provide a coordination method which enables to have a coordination which is appropriate and speedy as far as possible, between the versatile application and the basic processing section in the mobile terminal.

Moreover, it is an object of the present invention to provide a mobile terminal which enables to have a coordination which is appropriate and speedy as far as possible, between the versatile application and the basic processing section.

Means for Solving Problem

The present invention, from a first aspect, is a coordination method for operating by coordination between a basic processing section which performs a control and processing of an internal resource, and a versatile application section which includes at least one versatile application which uses a function of the basic processing section, in a mobile terminal, comprising steps of; judging a condition for combining at which, when a start-up command for a specific versatile application of the versatile application section is made when a native application included in the basic processing section is being executed, a judgment of whether or not the specific versatile application is in a paused state, and whether or not the specific versatile application is an application which has made a request for a start-up of the native application is made; and restarting the execution at which, when a judgment result at the step of judging the condition for combining is affirmative, an execution of the specific versatile application is restarted.

In this coordination method, when the start-up command for the specific versatile application of the versatile application section is made when the native application included in the basic processing section is being executed, at the step of judging the condition for combining, the judgment of whether or not the specific versatile application is in the paused state, and whether or not the specific versatile application is an application which has made the request for the start-up of the native application, is made. In other words, a judgment of whether or not the execution of the native application is during an extension of the execution of the specific versatile application, and further, whether or not the specific versatile application is an extension thereof, is made at the step of judging the condition for combining.

Moreover, when the judgment result at the step of judging the condition for combining is affirmative, at the step of restarting, the execution of the specific versatile application is restarted. As a result, the execution of the specific versatile application is restarted automatically, and promptly, with minimized odd feeling by a user. An automatic and prompt switching from the native application to the specific versatile application also contributes to minimize the odd feeling of the user.

Consequently, according to the coordination method of the present invention, it is possible to have a coordination which is appropriate and speedy as far as possible, between the basic processing section and the versatile application, in the mobile terminal.

The coordination method of the present invention can be let to further comprise steps of; judging a condition for a pausing at which, when the judgment result at the step of judging the condition for combining is negative, a judgment of whether or not there exists a versatile application which is in a paused state is made; stopping at which, when a judgment result at the step of judging the condition for the pausing is affirmative, the versatile application which is in the paused state is stopped; and starting up at which the specific versatile application is started up.

In this case, when the judgment result at the step of judging the condition for combining is negative, at the step of judging the condition for the pausing, the judgment of whether or not there exists a versatile application which is in the paused state is made. In other words, a judgment of whether or not there exists a versatile application which is in the paused state for which it is considered that there is no continuity with the execution of the native application which is being executed currently, is made at the step of judging the condition for the pausing.

When the judgment result at the step of judging the condition for the pausing is affirmative, at the step of stopping, the versatile application which is in the paused state is stopped.

Next, after the versatile application which is in the paused state is stopped, at the step of starting up, the specific versatile application is started up. It is possible to make an arrangement such that prior to stopping the versatile application which is in the paused state, the user's approval is to be taken for stopping the versatile application.

Consequently, by executing the native application, it is possible to start up the specific application in the form of starting the execution newly, without an odd feeling by the user, which is formed separately from the versatile application which is in the paused state.

In this case, when the judgment result at the step of judging the condition for the pausing is negative, it is possible to perform immediately the step of starting up. In this case, it is possible to start up the specific application in the form of starting the execution newly, without the odd feeling by the user, which is formed newly by the execution of the native application.

In the coordination method of the present invention it is possible to let the native application to be a TV process application of processing upon receiving a TV broadcasting signal, and to let the specific versatile application to be an electronic program guide application. In this case, it is possible to have a coordination which is appropriate and speedy as far as possible, between the television process application which is a native application, and the electronic program guide application which is a versatile application.

The present invention, from a second aspect, is a mobile terminal which is operated by coordination between a basic processing section which performs a control and processing of an internal resource, and a versatile application section which includes at least one versatile application which uses a function of the basic processing section. The basic processing section comprises; a native application; a condition judging means which, when a start-up command for a specific versatile application of the versatile application section is made when the native application is being executed, judges a condition for combining of whether or not the specific versatile application is in a paused state, and whether or not the specific versatile application is an application which has made a request for a start-up of the native application; and an application execution controlling means which, a judgment result by the condition judging means is affirmative, restarts an execution of the specific versatile application.

In this mobile terminal, when the start-up command for the specific versatile application of the versatile application section is made when the native application is being executed, the combining condition judging means makes the judgment of whether or not the specific versatile application is in the paused state, and whether or not the specific versatile application is an application which has made the request for the start-up of the native application. When the judgment result of the combining condition judging means is affirmative, the application execution controlling means restarts the execution of the specific versatile application.

In other words, in the mobile terminal of the present invention, it is possible to use the abovementioned coordination method. Consequently, according to the mobile terminal of the present invention, it is possible to have an appropriate and speedy as far as possible, coordination between the basic processing section and the versatile application.

In the mobile terminal of the present invention, it is possible to make a structure such that the condition judging means further makes a judgment of a condition for a pausing by judging whether or not there exists a versatile application which is in a paused state, when the result of judging the condition for combining is negative, and the application execution controlling means after stopping the versatile application which is in the paused state, starts up the specific versatile application, when the judgment result of judging the condition for the pausing is affirmative.

In this case, when the result of judging the condition for combining is negative, the condition judging means further makes the judgment of whether or not there exists a versatile application which is in the paused state. When the judgment result is affirmative, the application execution controlling means stops the versatile application which is in the paused state. Next, the application execution controlling means starts up the specific versatile application. It is possible to make an arrangement such that prior to stopping the versatile application which is in the paused state, the user's approval is to be taken for stopping the versatile application.

Consequently, by executing the native application, it is possible to start up the specific application in the form of starting the execution newly, without odd feeling by the user, which is formed separately from the versatile application which in the paused state.

In this case, it is possible to make an arrangement such that when the judgment result of judging the condition for the pausing is negative, the application execution controlling means starts up the specific versatile application immediately. In this case, it is possible to start up the specific application in the form of starting the execution newly, without the odd feeling by the user, which is formed newly by the execution of the native application.

Moreover, in the mobile terminal of the present invention, it is possible to have a structure such that the mobile terminal further comprises a TV processing means which performs processing upon receiving a television broadcasting signal, and the specific native application is let to be a TV process application which controls the TV processing means, and the specific versatile application is let to be an electronic program guide application. In this case, it is possible to have an appropriate and speedy as far as possible, coordination between the TV processing application which is a native application, and the electronic program guide application which is a versatile application.

Moreover, in the mobile terminal of the present invention, it is possible to have a structure such that the mobile terminal further comprises a wireless communication section which performs a wireless communication with a base station of a mobile communication network. In other words, it is possible to let the mobile terminal of the present invention to be a mobile communication terminal such as a cellular phone.

Effect of the Invention

As it has been described above, according to a coordination method of the present invention, there is shown an effect that it is possible to have an appropriate and speedy as far as possible, coordination between a basic processing section and a versatile application in a mobile terminal.

Moreover, according to a mobile terminal of the present invention, there is shown an effect that it is possible to have an appropriate and speedy as far as possible, coordination between the basic processing section and the versatile application.

DETAILED DESCRIPTION

An embodiment of the present invention will be described below while referring to FIG. 1A to FIG. 12. In the diagrams, same reference numerals are assigned to similar or same components, and the repeated description is omitted.

Figure 1A:
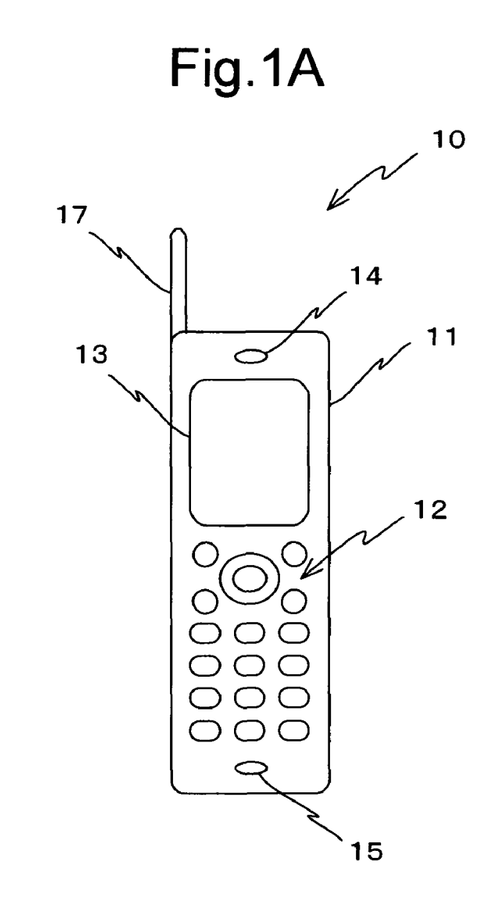
FIG. 1A is a diagram showing schematically a front-side external view of a cellular phone according to an embodiment of the present invention.
Figure 1B:
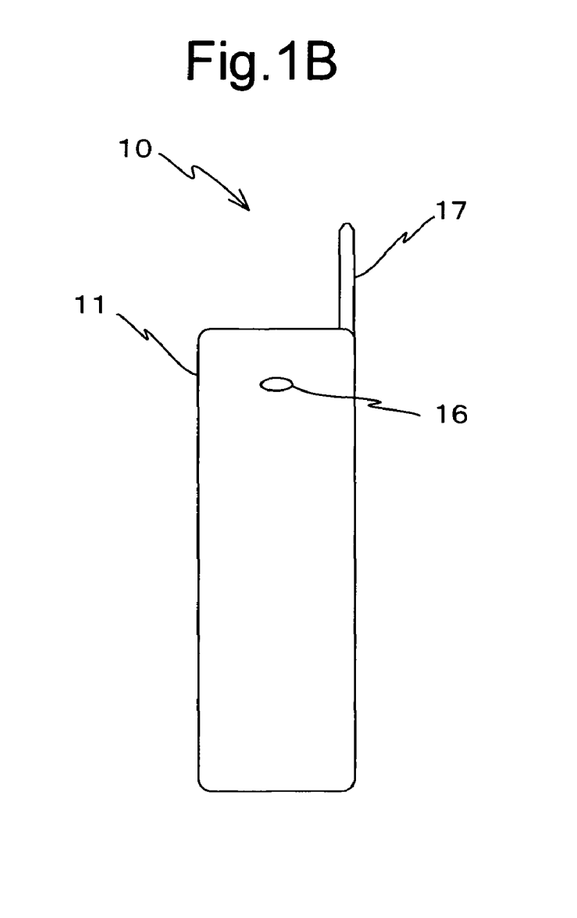
FIG. 1B is a diagram showing schematically a rear-side external view of the cellular phone according to the embodiment of the present invention.
Figure 2:
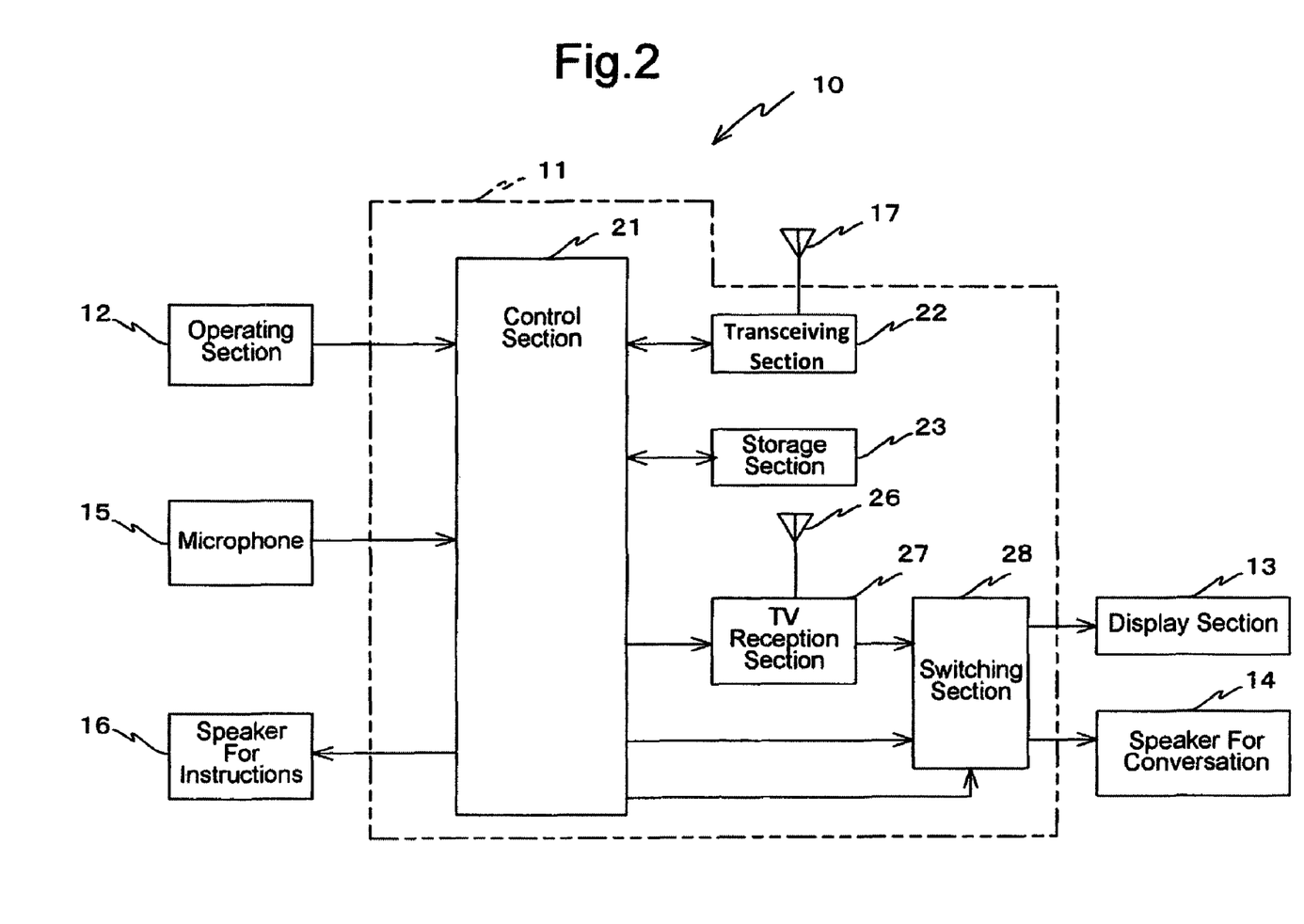
FIG. 2 is a functional block diagram of the cellular phone in FIG. 1A and FIG. 1B.

FIG. 1A, FIG. 1B, and FIG. 2 show schematically a structure of a cellular phone 10 which is a mobile terminal according to the embodiment. Here, in FIG. 1A a front-side external view of the cellular phone 10 is shown, and in FIG. 1B, a rear-side external view of the cellular phone 10 is shown. Moreover, in FIG. 2, a functional block structure of the cellular phone 10 is shown.

As it is shown comprehensively in FIG. 1A and FIG. 1B, the cellular phone 10 includes (a) a cellular phone main body 11, (b) an operating section 12, and (c) a display section 13. The cellular phone main body 11 accommodates sections such as a control section 21 (refer to FIG. 2) which will be described later. The operating section 12 has a numerical keypad for inputting a telephone number and so forth to the control section 21, and function keys for inputting to the control section 21 various commands such as switching of an operation mode. The display section 13 has a liquid crystal display device which displays operation instructions, operation situation, and a message received, according to a command by the control section 21. Moreover, the cellular phone 10 includes (d) a speaker for conversation 14, (e) a microphone 15, (f) a speaker for instructions 16, and (f) an antenna 17. The speaker for conversation 14 is for reproducing an aural signal transmitted from a communication counterpart during conversation. The microphone 15 is for inputting voice at the time of conversation. The speaker for instructions 16 is for generating a sound informing an incoming call or mail and a sound informing an instruction sound. The antenna 17 connected to a transceiving section 22 is for transferring a wireless signal between the cellular phone 10 and a base station.

The cellular phone main body 11, as shown in FIG. 2, includes (i) the control section 21, (ii) the transceiving section 22 for performing a communication between the cellular phone 10 and the base station, and (iii) a storage section 23 which stores various data. Moreover, the cellular phone main body 11 includes (iv) an antenna for TV 26, (v) a TV reception section 27 which processes a TV broadcasting signal which is received via the antenna for TV 26, by using a tuner for TV, and (vi) a switching section 28 which switches by a command from the control section 21, a mode which prioritizes an image signal and an aural signal from the control section 21, and a mode which prioritizes an image signal and an aural signal from the TV reception section 27, in an output signal to the display section 13 and the speaker for conversation 14.

Figure 3:
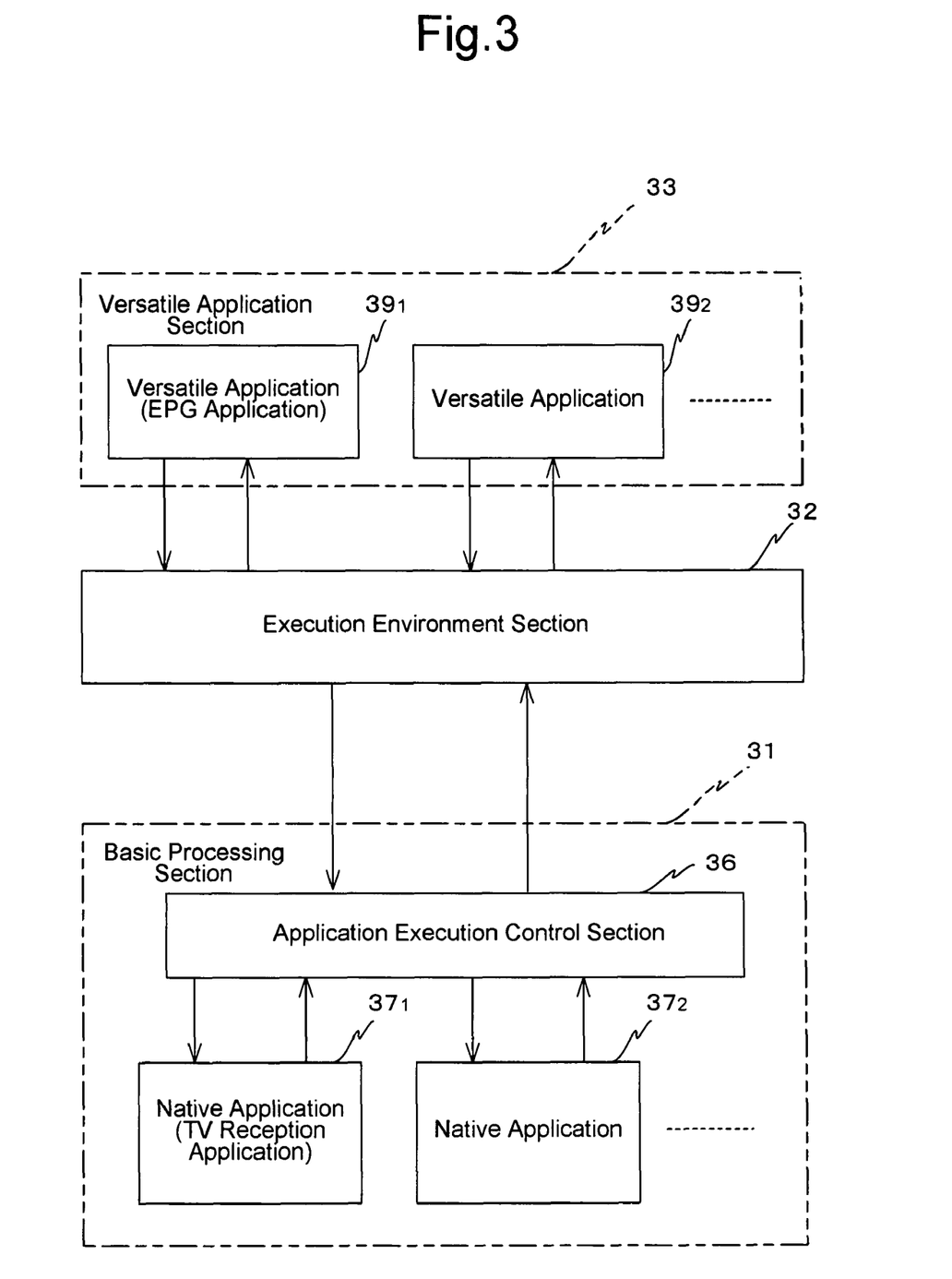
FIG. 3 is a diagram showing schematically a structure of the software which is operated in a control section in FIG. 2.

The control section 21 includes a processor such as a central processing unit (CPU) and a digital signal processor (DSP), and performs various data processing and an operation control of other components mentioned above, for realizing normal cellular phone functions. A configuration of the software such as a computer program executed in the control section 21 is as shown in FIG. 3.

In other words, the software in the control section 21 includes (i) a basic processing section 31 which realizes a conversation function and a mail function which are basic functions as a cellular phone, and performs a task management and a control of various hardware resources, (ii) a versatile application section 33 which provides various contents to a user, and (iii) an execution environment section 32 which is positioned between the basic processing section 31 and the versatile application section 33, and provides an execution environment of versatile applications $39_1$, $39_2$, ... included in the versatile application section 33. In this embodiment, the execution environment section 32 is a set of computer programs which provides a software resource for executing the versatile applications $39_1$, $39_2$ ... by performing a command conversion between the versatile applications $39_1$, $39_2$, ... described in JAVA (registered trademark) for example, and the basic processing section 31.

The basic processing section 31 and the execution environment section 32 are installed in the cellular phone 10 at the time of shipment from a factory of the cellular phone 10. On the other hand, the versatile applications $39_1$, $39_2$ ... are applications which are pre-installed, and many of the versatile applications are installed after downloading from the transceiving section 22 by an operation on the operating section 12 by an operator. In this embodiment, the versatile application $39_1$ is an electronic program guide application (hereinafter, also called as "EPG (Electronic Program Guide) application" or "EPG appli").

Information such as an occurrence of an event, a response, and a request associated with the versatile applications $39_1$, $39_2$, ... is exchanged when deemed appropriate, between the basic processing section 31 and the execution environment section 32. Moreover, between the execution environment section 32 and the versatile applications $39_1$, $39_2$, various requests from the versatile applications $39_1$, $39_2$ ... are notified to execution environment section 32, and the occurrence of an event, and the response are notified from the execution environment section 32 to the versatile applications $39_1$, $39_2$, ....

The basic processing section 31 includes an application execution control section 36 which performs a control and a management of execution of an application, and native applications $37_1$, $37_2$, .... The application execution control section 36 performs directly an execution control of the native applications $37_1$, $37_2$, ..., and also performs an execution control of the versatile applications $39_1$, $39_2$, ... via the execution environment section 32. In this embodiment, the native application $37_1$ is a TV reception processing application (hereinafter, called as "TV appli").

Next, a coordination operation between the basic processing section 31 and the versatile applications $39_1$, $39_2$, ... in the cellular phone 10 structured as mentioned above, will be described by focusing the attention on a case in which a start-up command is made for any one of the versatile applications $39_1$, $39_2$, ... when any one of the native applications $37_1$, $37_2$, ... is executed. An example of a case in which the start-up command of an EPG appli $39_1$ in the versatile applications $39_1$, $39_2$, ... is made during the execution of the TV appli $37_1$ in the native applications $37_1$, $37_2$, ... will be described below.

<When a Versatile Application in a Paused State Does Not Exist>

Figure 4:
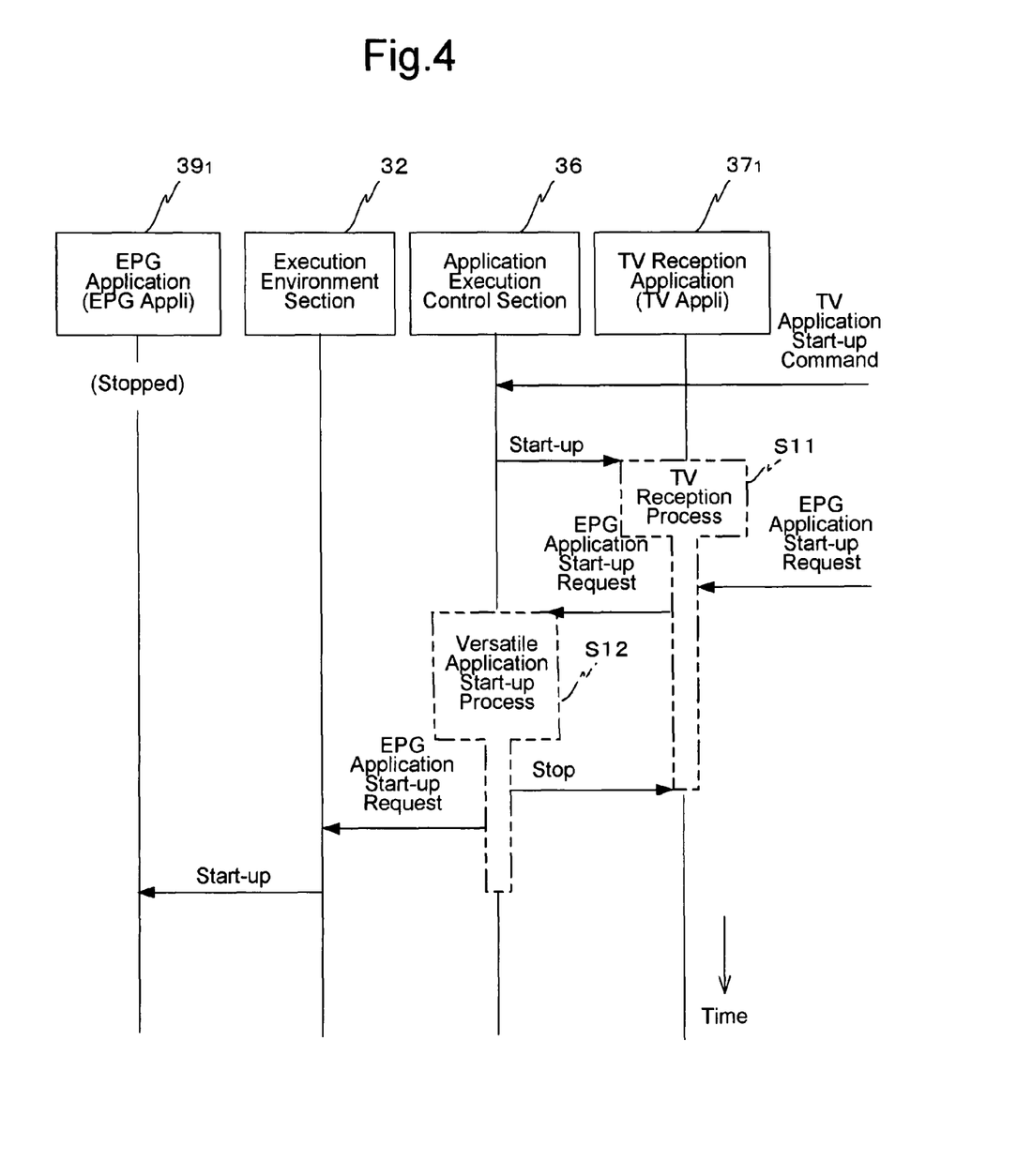
FIG. 4 is a sequence diagram for describing a coordination operation when there does not exist a versatile application which is in a paused state.

When the start-up command for the TV appli $37_1$ is given by the user when each one of the versatile applications $39_1$, $39_2$, ... is stopped, as shown in FIG. 4, the start-up command is notified to the application execution control section 36. The application execution control section 36 which has received the notification starts up the TV appli $37_1$. As a result, an operation of the TV appli $37_1$ is started and the TV appli $37_1$, at step S11, performs a TV reception processing. An example of a screen display on the display section 13 when such a TV reception processing is performed is shown in FIG. 5A.

Figure 5A:
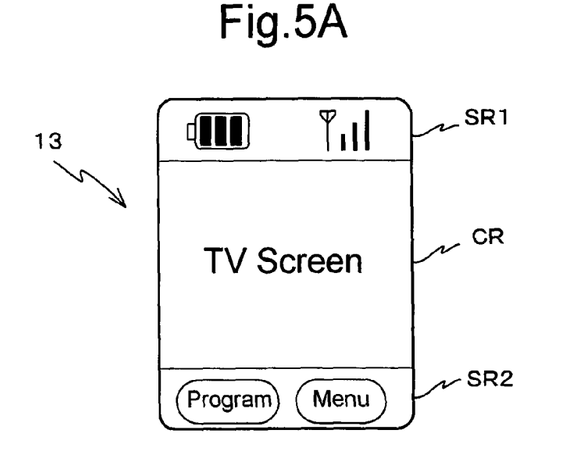
FIG. 5A is a diagram (No. 1) showing an example of display on a display section in the coordination operation in FIG. 4.

As shown in FIG. 5A, the display screen on the display section 13 has system display areas SR1 and SR2 which can be displayed only by the basic processing section 31 and a common display area CR which can be displayed both by the basic processing section 31 and the versatile application $39_j$ (j=1, 2, ... ). A TV image is displayed on the common display area CR. At the time of TV reception process by the TV appli $37_1$, a setting is made in the switching section 28 for supplying to the display section 13 and the speaker for communication 14, an image signal and an aural signal from the TV reception section 27 on a priority basis, as an image signal for the common display area CR and an aural signal for the speaker for communication 14.

When a soft key "program" in FIG. 5A in the TV reception processing is selected by the user, the EPG appli start-up command is notified to the TV appli $37_1$ as shown in FIG. 4.

The TV appli $37_1$ which has received the notification sends an EPG appli start-up request to the application execution control section 36. When the application execution control section 36 receives the EPG appli start-up request, the application execution control section 36 executes a versatile application start-up process at step S12.

Figure 6:
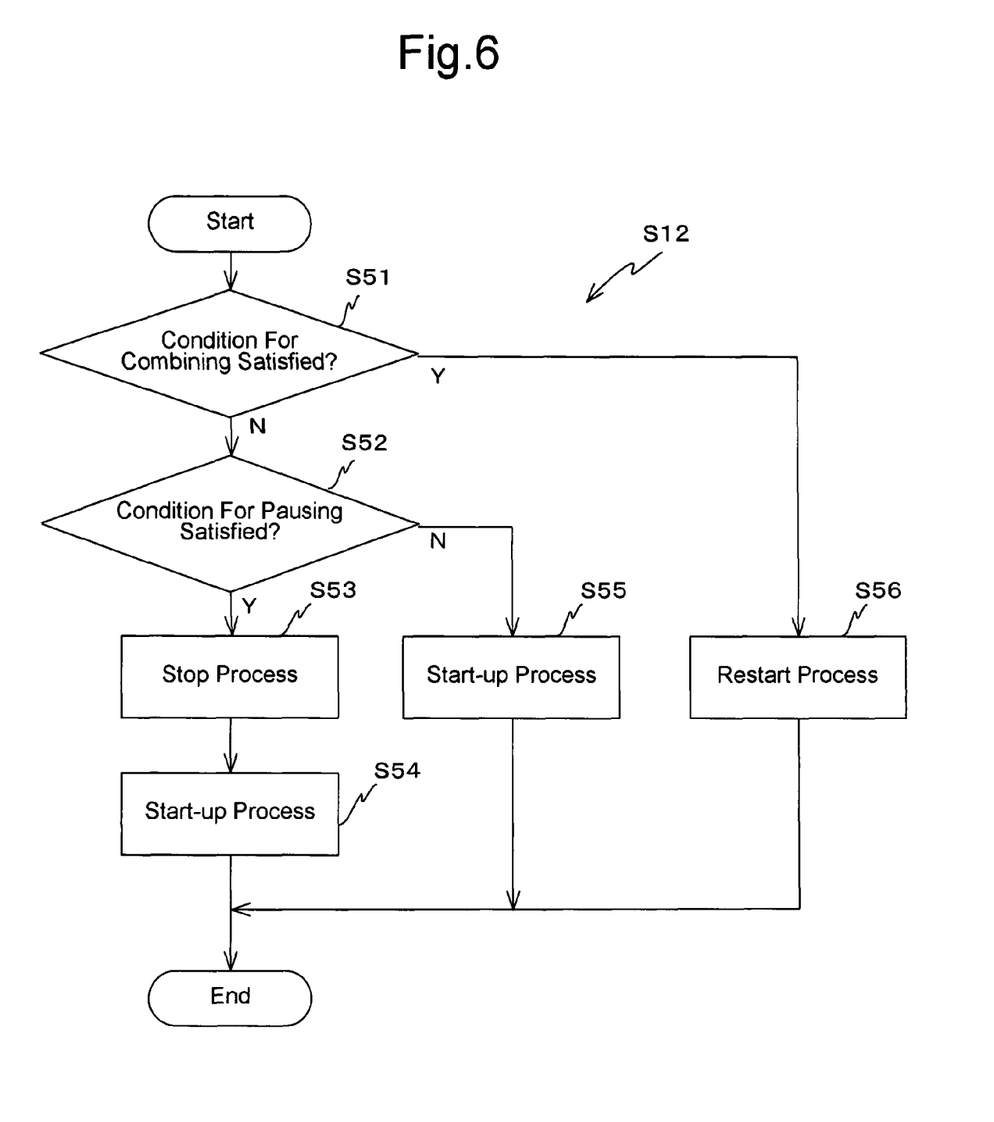
FIG. 6 is a flowchart for describing a versatile application start-up process.

At the versatile application start-up process at step S12, as shown in FIG. 6, first of all, at step S51, the application execution control section 36 makes a judgment of the following combining condition is satisfied: whether or not the EPG appli $39_1$ is in the paused state, and the EPG appli $39_1$ is paused as a result of the request for the start-up of the TV appli $37_1$. In this embodiment, as it has been mentioned above, since the TV appli $37_1$ is started up by the user while each of the versatile applications $39_1$, $39_2$, . . . is stopped, a negative judgment is made at step S51, and the process is advanced to step S52.

At step S52, the application execution control section 36 makes a judgment of whether or not a condition for a pausing namely there exists a versatile application which is in the paused state is satisfied. In this embodiment, as it has been mentioned above, since the TV appli $37_1$ is started up while each of the versatile applications $39_1$, $39_2$, . . . is stopped, a negative judgment is made at step S52, and the process is advanced to step S55.

At step S55, the application execution control section 36 performs a start-up process of the EPG appli $39_1$. In the start-up process of the EPG appli $39_1$, as shown in FIG. 4, first of all, the application execution control section 36 stops the TV appli $37_1$. At the time of stopping the TV appli $37_1$, a setting is made in the switching section 28 for supplying to the display section 13 and the speaker for communication 14, an image signal and an aural signal from the control section 21 on a priority basis, as an image signal for the common display area CR and an aural signal for the speaker for communication 14.

Figure 5B:
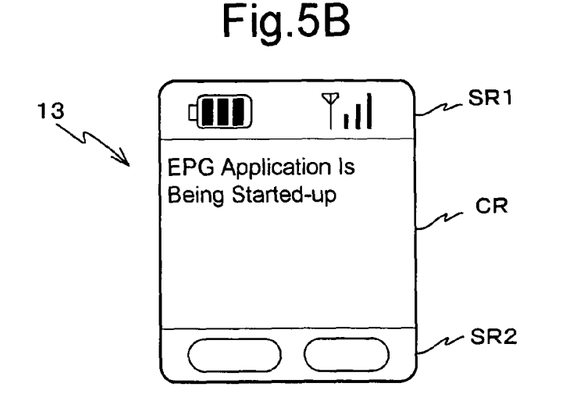
FIG. 5B is a diagram (No. 2) showing an example of display on the display section in the coordination operation in FIG. 4.
Figure 5C:
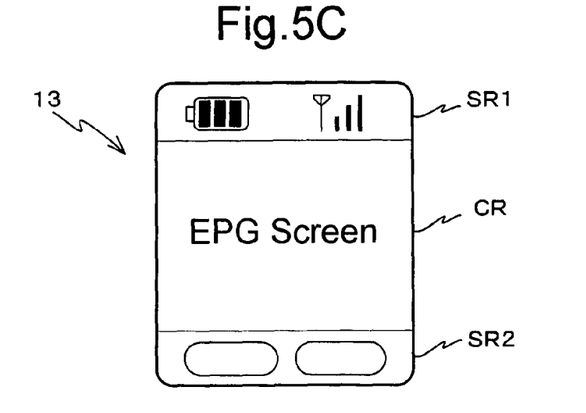
FIG. 5C is a diagram (No. 3) showing an example of display on the display section in the coordination operation in FIG. 4.

Next, the application execution control section 36 sends a request for start-up of the EPG appli $39_1$, to the execution environment section 32. The execution environment section 32 which has received the start-up request, starts up the EPG appli $39_1$. During the start-up process, a state of being started up is displayed on the common display area CR of the display section 13 as shown in FIG. 5B. As the EPG appli $39_1$ starts an operation, an image by the EPG appli $39_1$ is displayed on the common display area CR of the display section 13 as shown in FIG. 5C.

<When Condition for Combining is Satisfied>

First of all, an occurrence of a situation in which the condition for combining is satisfied will be described below.

Figure 7:
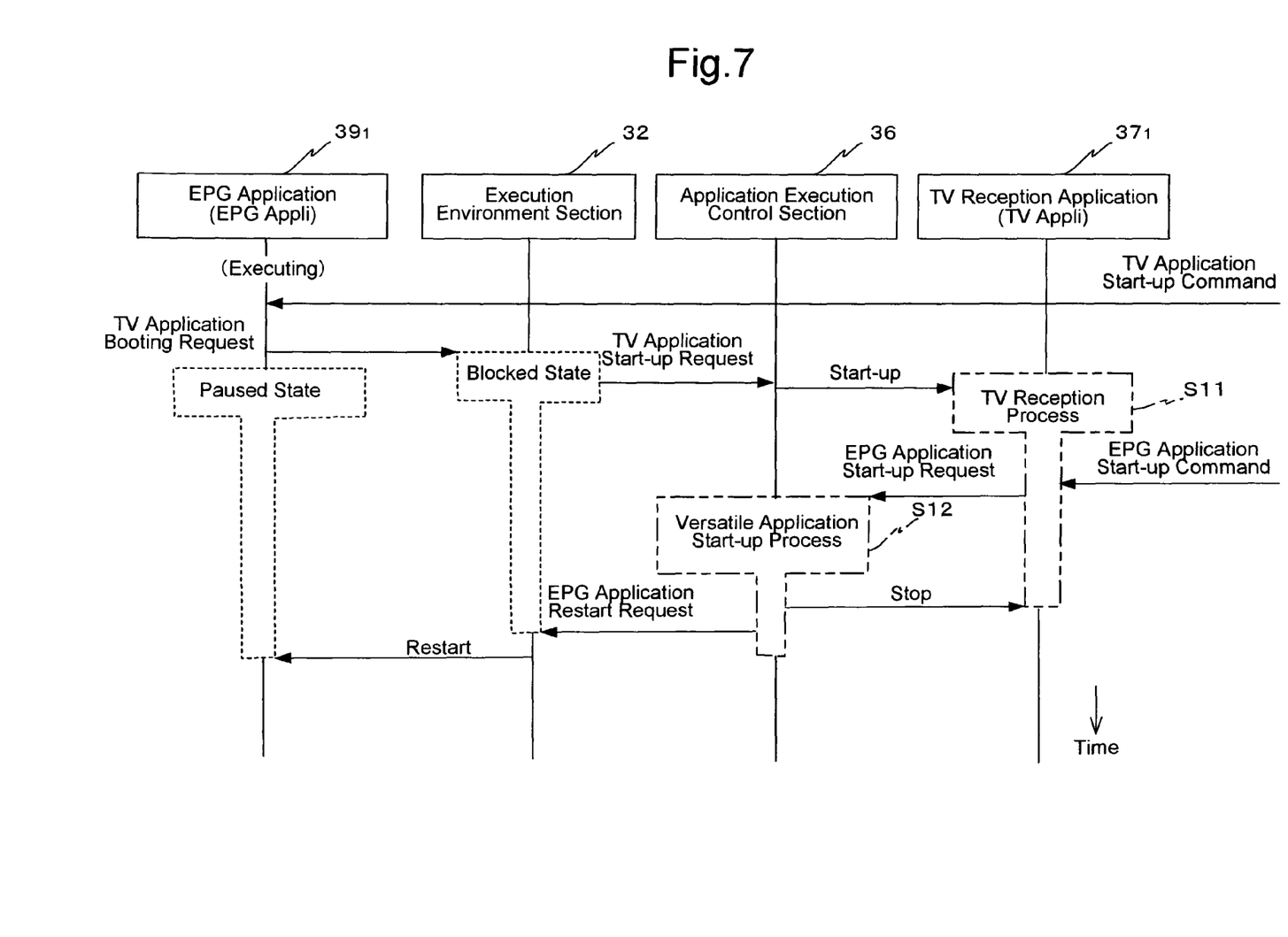
FIG. 7 is a sequence diagram for describing a coordination operation when a condition for combining is satisfied.

As shown in FIG. 7, when a command to start-up the TV appli $37_1$ is made by the user during the execution of the EPG application $39_1$, making of the command is notified to the EPG appli $39_1$. The EPG appli $39_1$ which has received the notification sends a request to start-up the TV appli $37_1$ to the execution environment section 32. The execution environment section 32 which has received the request to start-up the TV appli $37_1$ assumes a blocked state in which no response is made to the request etc. from the EPG appli $39_1$. As a result, the EPG appli $39_1$ assumes a paused state.

Next, the execution environment section 32 sends the request to start-up the TV appli $37_1$ to the application execution control section 36. The application execution control section 36 which has received the start-up request starts up the TV appli $37_1$. As a result, an operation of the TV appli $37_1$ is started, and the TV appli $37_1$ performs the TV reception process at step S11. An example of a screen display similar to FIG. 5A described above on the display section 13, in the TV reception process is shown in FIG. 8A.

Thus, there occurs to be a situation in which the condition for combining namely the EPG appli $39_1$ is in the paused state, and the EPG appli $39_1$ is paused as a result of the request for start-up of the TV appli $37_1$ is satisfied.

Figure 8A:
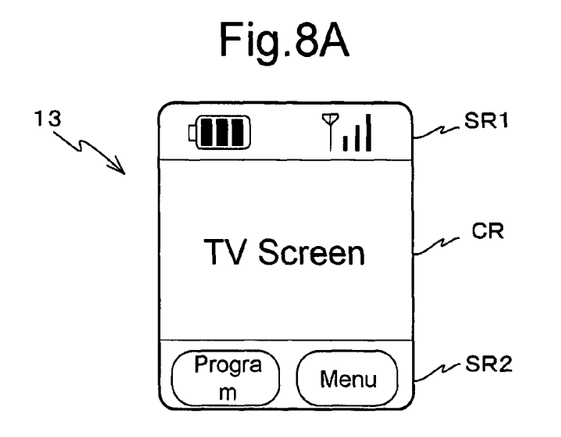
FIG. 8A is a diagram (No. 1) showing an example of display on the display section in the coordination operation in FIG. 7.

When the soft key "program" in FIG. 8A is selected by the user during the TV reception process in such situation, as shown in FIG. 7, the EPG application start-up command is notified to the TV appli $37_1$ similarly as in a case in which the versatile application which is in the paused state does not exist. Next, as the TV appli $37_1$ sends an EPG appli start-up request to the application execution control section 36, the application execution control section 36 which has received the EPG start-up request executes a versatile application start-up process at step S12.

In the versatile application start-up process at step S12, as shown in FIG. 6, first of all at step S51, the application execution control section 36 makes a judgment of whether or not the condition for combining is satisfied. In this case, since the condition for combining is satisfied, at step S51, an affirmative judgment is made, and the process is advanced to step S56.

Figure 8B:
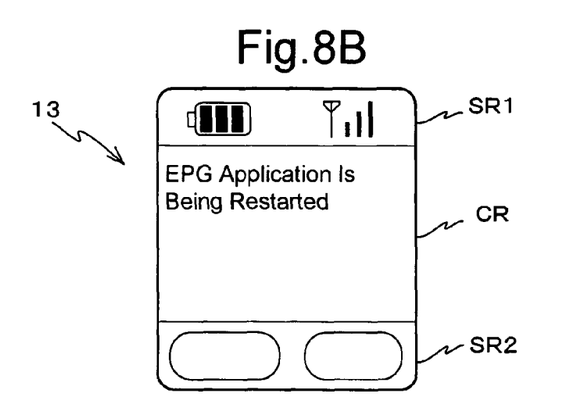
FIG. 8B is a diagram (No. 2) showing an example of display on the display section in the coordination operation in FIG. 7.
Figure 8C:
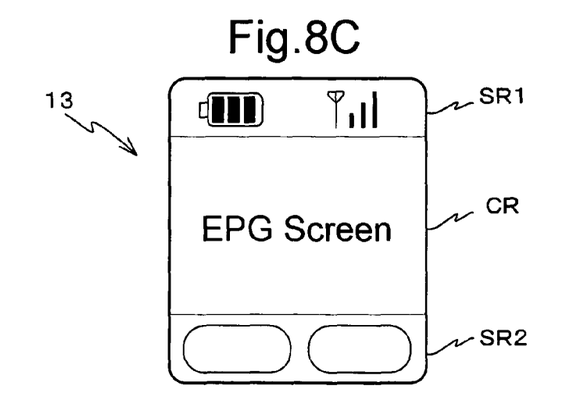
FIG. 8C is a diagram (No. 3) showing an example of display on the display section in the coordination operation in FIG. 7.

At step S56, a process of restarting the EPG appli $39_1$ is performed. In the restarting process of the EPG appli $39_1$, as shown in FIG. 7, first of all, the application execution control section 36 stops the TV appli $37_1$. Next, the application execution control section 36 sends a request for restarting the EPG application $39_1$, to the execution environment section 32. The execution environment section 32 which has received the request for restarting releases the blocked state and restarts the EPG appli $39_1$. During the restarting process, as shown in FIG. 8B, a situation of being restarted is displayed on the common display area CR of the display section 13. Further, as the EPG appli $39_1$ starts the operation, as shown in FIG. 8C, a display similar to the display in FIG. 5C is made on the display section 13.

<When Condition for Combining is Not Satisfied and Condition for Pausing is Satisfied>

Figure 9:
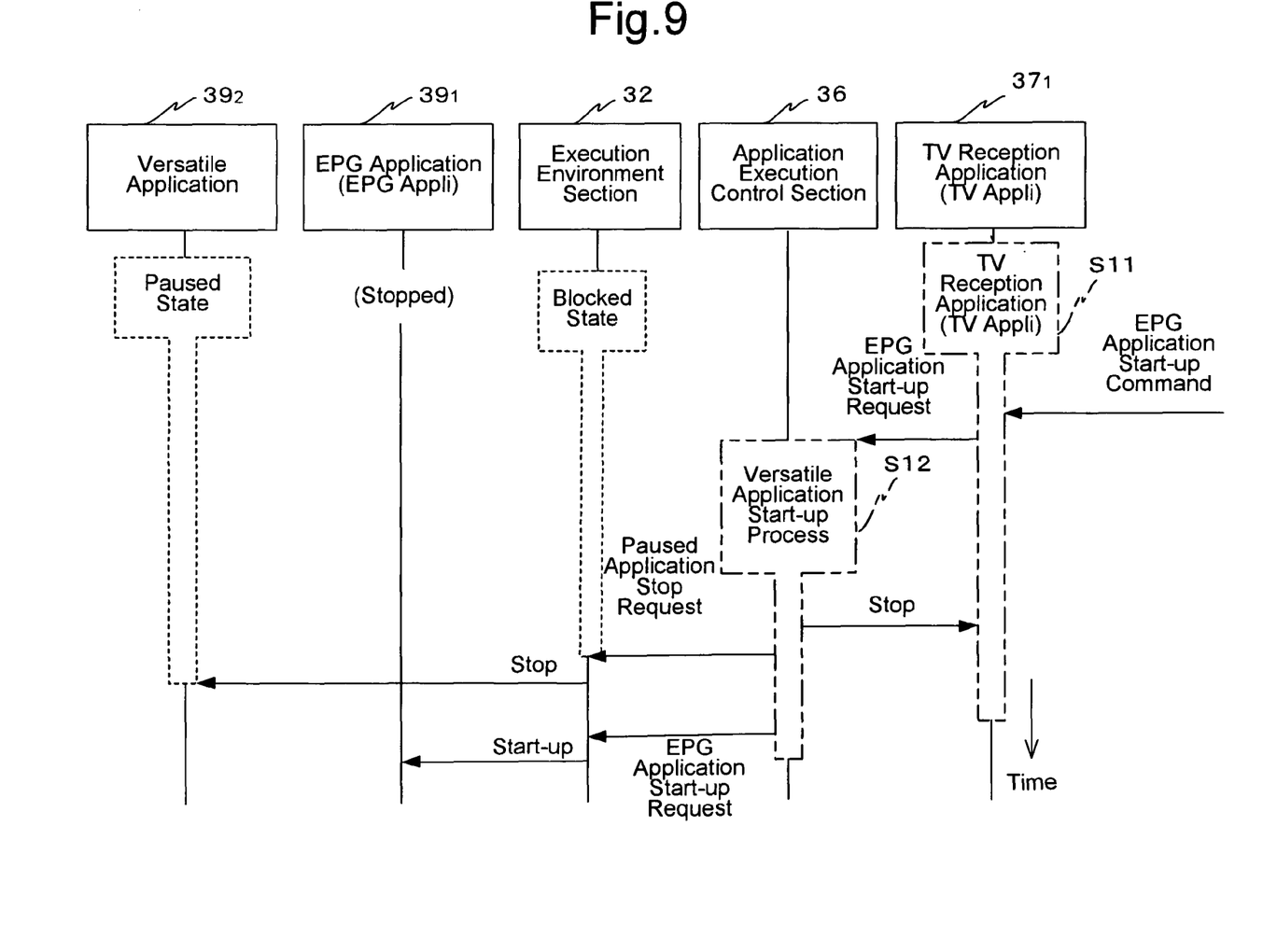
FIG. 9 is a sequence diagram (No. 1) for describing a coordination operation when the condition for combining is not satisfied and the condition for pausing is satisfied.

A case in which any one of the versatile applications $39_2$, . . . except the EPG appli $39_1$ (versatile application $39_2$ in FIG. 9) is in the paused state as in an initial situation in FIG. 9 is an example of the case in which the condition for combining is not satisfied and the condition for the pausing is satisfied. In the following description, the versatile application $39_2$ is let to be the versatile application in the paused state.

Such a situation occurs when the versatile application $39_2$ except the EPG appli $39_1$ makes a request for start-up of the TV appli $37_1$, and when the user pauses the versatile application $39_2$. In such a situation, even when the TV reception process is executed by the TV appli $37_1$ at step S11, a display similar to the display in FIG. 5A and FIG. 8A is made on the display section 13 as shown in FIG. 10A.

Figure 10A:
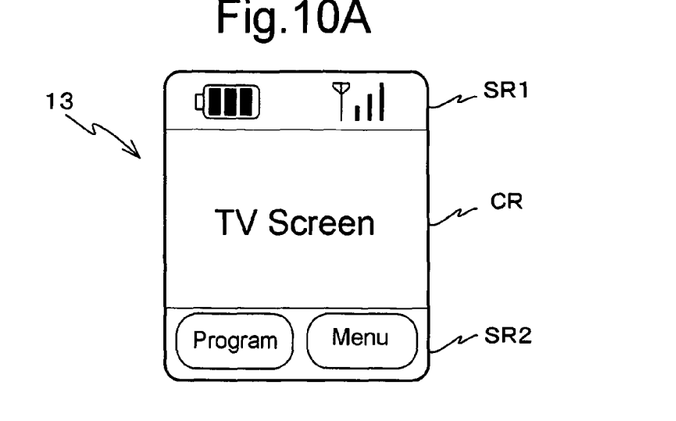
FIG. 10A is a diagram (No. 1) showing an example of display on the display section in the coordination operation in FIG. 9.

Next, during the execution of the TV reception process, when the soft key "program" in FIG. 10A is selected by the user, as shown in FIG. 9, the EPG appli start-up command is notified to the TV appli $37_1$ similarly as in a case in which the versatile application in the paused state does not exist. Further, as the TV appli $37_1$ sends a request for start-up of the EPG appli to the application execution control section 36, the application execution control section 36 which has received the EPG appli start-up request, executes a versatile application start-up process at step S12.

In the versatile application start-up process at step S12, as it is shown in FIG. 6 described above, first of all, at step S51, the application execution control section 36 makes a judgment of whether or not the condition for combining is satisfied. Since the condition for combining is not satisfied in this case, at step S51, a negative judgment is made, and the process is advanced to step S52.

At step S52, the application execution control section 36 makes a judgment of whether or not a condition for the pausing namely there exists a versatile application which is in the paused state, is satisfied. In this case, since the condition for the pausing is satisfied, at step S52, an affirmative judgment is made, and the process is advanced to step S53.

Figure 10B:
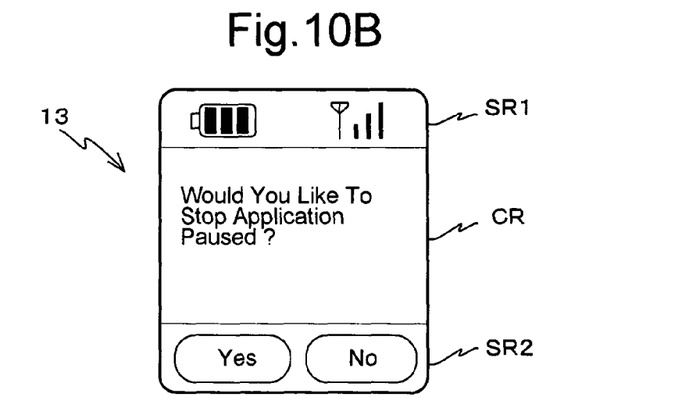
FIG. 10B is a diagram (No. 2) showing an example of display on the display section in the coordination operation in FIG. 9.
Figure 10C:
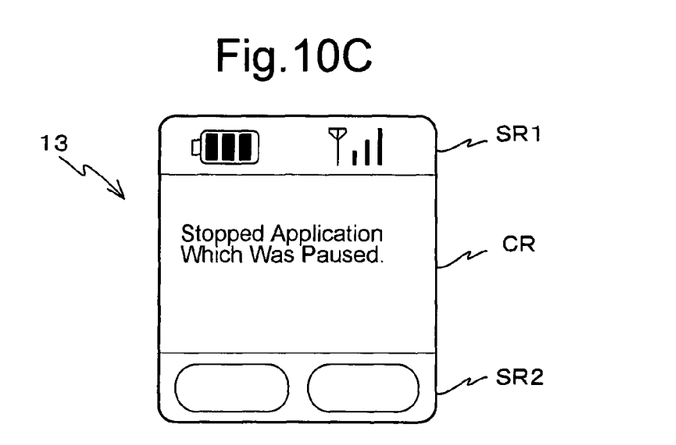
FIG. 10C is a diagram (No. 3) showing an example of display on the display section in the coordination operation in FIG. 9.

At step S53, the application execution control section 36 performs a process of stopping the versatile application $39_2$ which is in the paused state. In this process of stopping, first of all, the application execution control section 36 displays on the display section 13 a stopping confirmation screen as shown in FIG. 10B. When the user selects a soft key "Yes" upon having a look at the stopping confirmation screen, the application execution control section 36, as shown in FIG. 9, stops the TV appli $37_1$ and sends a request to stop the versatile application $39_2$ to the execution environment section 32. The execution environment section 32 which has received the request to stop releases the blocked state, and stops the versatile application $39_2$. Thus, as the versatile application $39_2$ is stopped, the application execution control section 36 displays on the display section 13 a stopping reporting screen as shown in FIG. 10C.

Figure 11A:
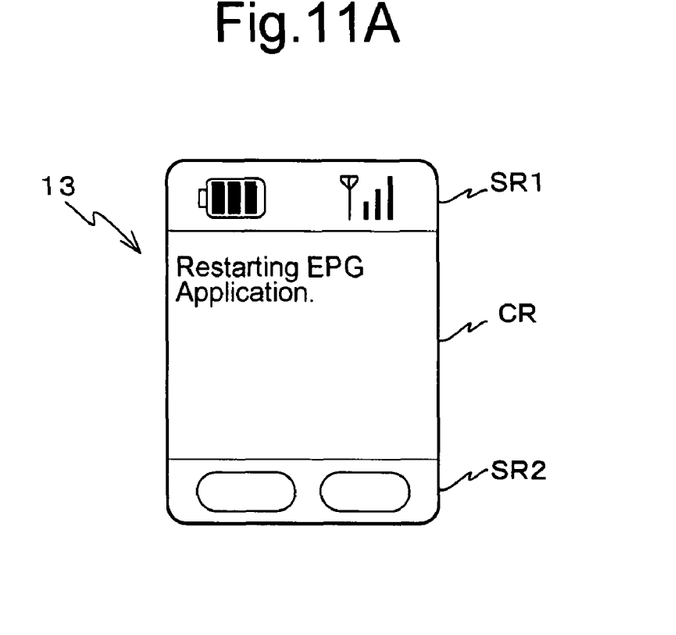
FIG. 11A is a diagram (No. 4) showing an example of display on the display section in the coordination operation in FIG. 9.
Figure 11B:
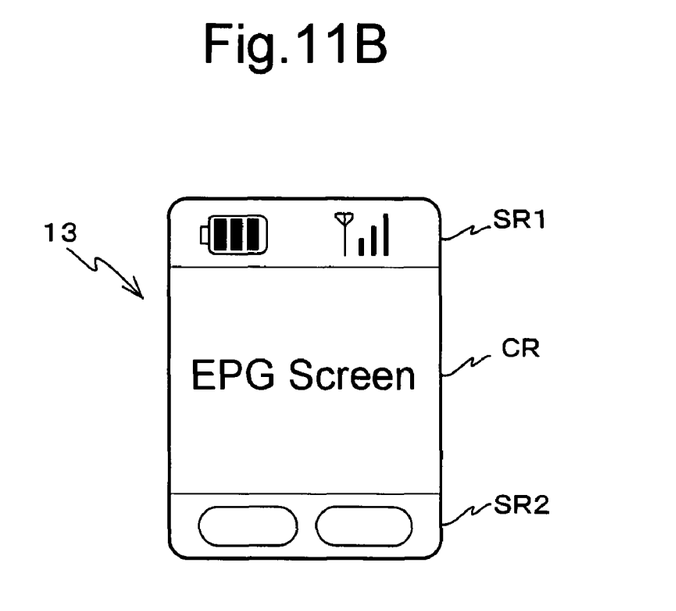
FIG. 11B is a diagram (No. 5) showing an example of display on the display section in the coordination operation in FIG. 9.
Figure 12:
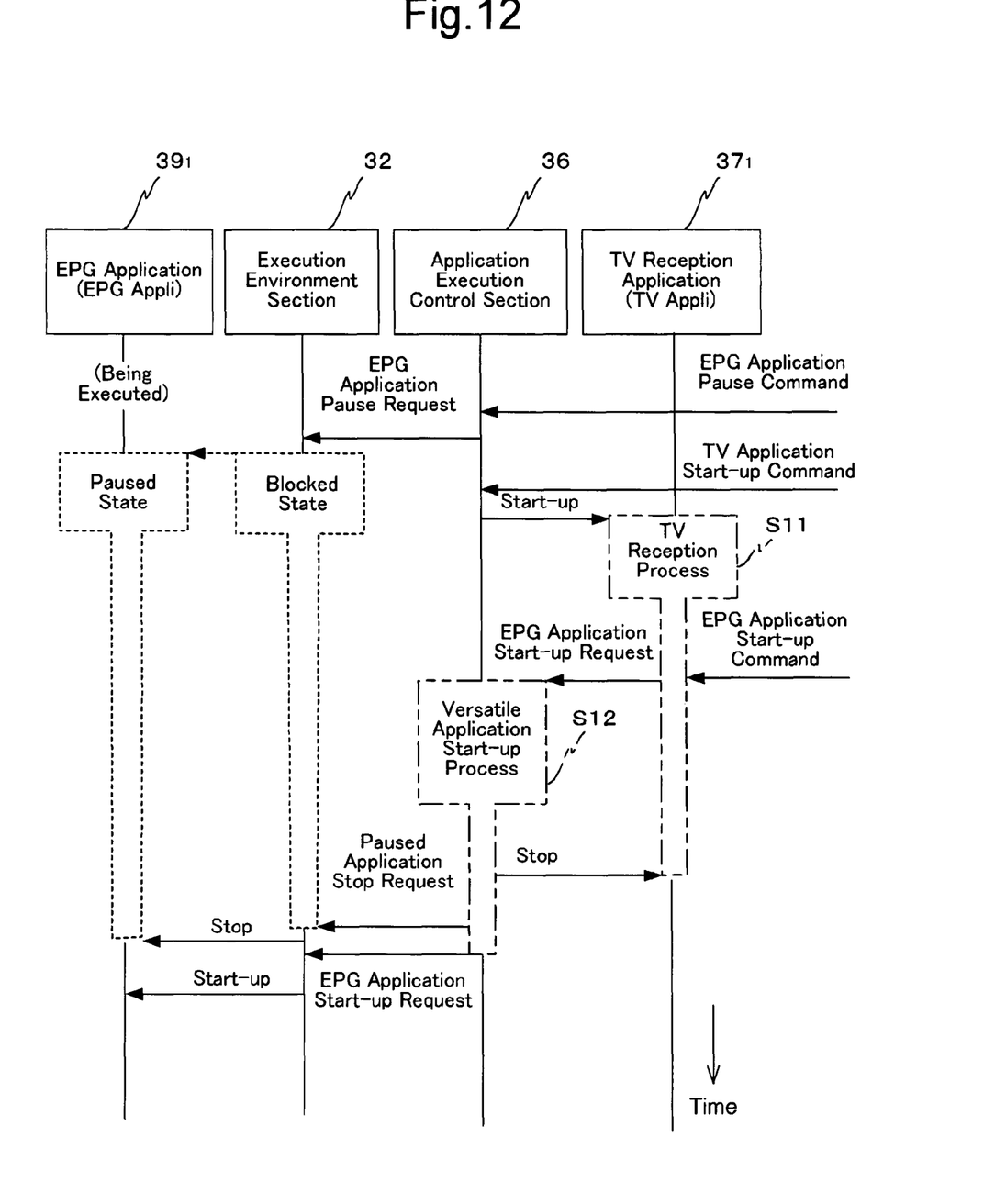
FIG. 12 is a sequence diagram (No. 2) for describing a coordination operation when the condition for combining is not satisfied, and a condition for a pausing is satisfied.

Next, at step S54, the application execution control section 36 performs a process to start-up the EPG appli $39_1$. In the process to start-up the EPG appli $39_1$, as shown in FIG. 9, the application execution control section 36 sends a request to start-up the EPG appli $39_1$ to the execution environment section 32. The execution environment section 32 which has received the request to start-up, starts up the EPG appli $39_1$. During the start-up process, as shown in FIG. 11A, a state of being started up similar to the state as in FIG. 5B is displayed on the display section 13. Further, as the EPG appli $39_1$ starts the operation, as shown in FIG. 11B, a screen similar to the screen in FIG. 5C is displayed on the display section 13.

During the display of the stopping confirmation screen in FIG. 10B, when the user selects a soft key "No", an arrangement is made such that the application execution control section 36 switches the common display area CR from the stopping confirmation screen to the TV image screen. As a result, a TV reception process including a display of a TV image by the TV appli $37_1$ is continued.

A case in which the EPG appli $39_1$ is in the paused state and the EPG appli $39_1$ has not made the request for the start-up of the TV appli $37_1$ is an example of a case in which the condition for combining is not satisfied but the condition for the pausing is satisfied. Such a situation occurs when a command for pausing the EPG appli $39_1$ is made by the user when the EPG application $39_1$ is being executed.

In this case, the application execution control section 36 which has received the command for pausing the EPG appli $39_1$ sends a request for pausing the EPG appli to the execution environment section 32. The execution environment section 32 which has received the request for pausing the EPG appli, assumes a blocked state. As a result, the EPG appli $39_1$ assumes the paused state.

When a command for start-up of the TV appli $37_1$ is made by the user during the paused state of the EPG appli $39_1$, similarly as when the versatile application which is in the paused state does not exist, the TV appli $37_1$ is started up, and the TV reception process is started at step S11. Further, during the execution of the TV reception process by the TV appli $37_1$, when a command to start-up the EPG appli is made by the user, at step S12, a versatile application start-up process similar as in the case in which the versatile application except the EPG appli $39_1$ is in the paused state, is performed.

Thus, as it has been described above, in the embodiment, when the command for starting up the EPG appli $39_1$ of the versatile application section 33 is made during the execution of the TV appli $37_1$ which is a native application included in the basic processing section 31, a judgment of the following condition for combining is satisfied: whether or not the EPG appli $39_1$ is in the paused sate, and the EPG appli $39_1$ has made a request for start-up of the TV appli $37_1$ is made. Moreover, when the judgment result is affirmative, the execution of the EPG appli $39_1$ is restarted at the step of restarting the execution. Consequently, according to the embodiment, it is possible to have an appropriate and a speedy as far as possible, coordination between the basic processing section 31 and the versatile applications $39_1$, $39_2$, . . . of the versatile application section 32, in the cellular phone 10.

Moreover, when the condition for combining is not satisfied, furthermore, a judgment of whether or not the condition for the pausing namely whether or not there exists a versatile application which is in the paused state is made. Furthermore, when the condition for the pausing is satisfied, after the versatile application which is in the paused state is stopped, the EPG appli $39_1$ is started up. Therefore, it is possible to start up the EPG appli $39_1$ in the form of starting the execution newly, without an odd feeling by the user, which is formed separately from the versatile application which is in the paused state, by the execution of the TV appli $37_1$.

Moreover, when the condition for the pausing is not satisfied, the EPG appli $39_1$ is started up immediately. Therefore, it is possible to start up promptly the EPG appli $39_1$ in the form of starting the execution newly, without an odd feeling by the user, which is formed newly by the execution of the TV appli $37_1$.

In the description of the embodiment, a case in which the command for starting up the EPG appli $39_1$ which is a versatile application, during the execution of the TV appli $37_1$ which is a native application is described. However, a coordination operation similar to the embodiment is also performed in a case in which the command for starting up any one of the versatile application $39_1$, $39_2$, . . . during the execution of a native application other than the TV appli $37_1$ is made. Moreover, even when a command for starting up any one of versatile application other than the EPG appli $39_1$ during the execution of the TV appli $37_1$ is made, the coordination operation similar to the coordination operation in the embodiment is performed.

Whereas, it is also possible to perform the coordination operation similar as in the embodiment, only between a specific native application and a specific versatile application.

Moreover, in the embodiment, the present invention is applied to a cellular phone. However, the present invention, as a matter of course, is also applicable to a mobile terminal other than the cellular phone.

INDUSTRIAL APPLICABILITY

Thus, a coordination method of the present invention is applicable to a coordination operation between a basic processing section and a versatile application in a mobile terminal. Moreover, a mobile terminal of the present invention is applicable to a mobile terminal in which the basic, processing section and the versatile application perform a coordination operation.

What is claimed is:

1. A coordination method for operating by coordination between a basic processing section which performs a control and a processing of an internal resource, and a versatile application section which includes at least one versatile application which uses a function of the basic processing section, in a mobile terminal comprising steps of:

judging a condition for combining at which, when a start-up command for a specific versatile application of the versatile application section is made while a native application included in the basic processing section is being executed, a judgment of whether or not the specific versatile application is in a paused state, and a judgment whether or not the native application is executing in accordance with a request for a start-up of the native application issued by the specific versatile application, is made; and restarting an execution at which, when both judgment results at the step of judging the condition for combining are affirmative, an execution of the specific versatile application is restarted.

2. The coordination method according to claim 1, further comprising steps of:

judging a condition for a pausing at which, when at least one of the results of the judgment is negative, a judgment of whether or not there exists a versatile application which is in a paused state is made;

stopping at which, when a judgment result at the step of judging the condition for the pausing is affirmative, the versatile application which is in the paused state is stopped; and starting up at which the specific versatile application is started up.

3. The coordination method according to claim 2, wherein when the judgment result at the step of judging the condition for the pausing is negative, the step of starting up is performed immediately.

4. The coordination method according to claim 1, wherein the native application is a television process application of processing upon receiving a television broadcasting signal, and the specific versatile application is an electronic program guide application.

5. A mobile terminal which is operated by coordination between a basic processing section which performs a control and a processing of an internal resource, and a versatile application section which includes at least one versatile application which uses a function of the basic processing section, wherein the basic processing section comprises a native application, a condition judging means which, when a start-up command for a specific versatile application of the versatile application section is made while the native application is being executed, makes a judgment of whether the following condition for combining is satisfied or not: the specific versatile application is in a paused state, and the native application is executing in accordance with a request for a start-up of the native application issued by the specific versatile application, and an application execution controlling means which, when a judgment result by the condition judging means is affirmative, restarts an execution of the specific versatile application.

6. The mobile terminal according to claim 5, wherein the condition judging means further makes a judgment of a condition for a pausing by judging whether or not there exists a versatile application which is in a paused state, when the result of judging the condition for combining is negative, and the application execution controlling means which after stopping the versatile application which is in the paused state, starts up the specific versatile application, when the judgment result of judging the condition for the pausing is affirmative.

7. The mobile terminal according to claim 6, wherein the application execution controlling means immediately starts up the specific versatile application, when the judgment result of judging the condition for pausing is negative.

8. The mobile terminal according to claim 5, further comprising:

a television processing means which performs processing upon receiving a television broadcasting signal, wherein the specified native application is a television processing application which controls the television processing means, and the specific versatile application is an electronic program guide application.

9. The mobile terminal according to claim 5, further comprising:

a wireless communication section which performs a wireless communication with a base station of a mobile communication network.

* * * * *